2,982,616
METHOD OF PRODUCING CALCIUM-FREE CRYSTALLINE CYANAMIDE

Kiichiro Sugino, 50 Yarai-machi, Shinjuku-ku; Keijiro Odo, 1 Nishidai-machi, Minato-ku; and Eiichi Ichikawa, 26 Hayashi-cho, Bunkyo-ku, all of Tokyo, Japan No Drawing. Filed Sept. 5, 1958, Ser. No. 759,128

5 Claims. (Cl. 23—190)

This invention relates to a manufacturing process of crystalline cyanamide and its concentrated solution from calcium cyanamide with industrial advantage.

Cyanamide is the most fundamental and important raw material among calcium cyanamide derivatives, however, it was rather difficult in the prior art to manufacture it as concentrated solution of high purity, and especially in a crystalline state from calcium cyanamide on an industrial scale. The difficulty is due to the physical and chemical properties of cyanamide itself, namely, it has high solubility in water (strong hygroscopicity) and remarkable reactivity, and especially it is so sensitive to pH of the solution that in spite of fair stability in neutral state both dimerisation and hydrolysis occur very easily at pH 8-12 and at pH below 2 or above 12 respectively. Further it is also very sensitive to heat.

Consequently, considerable efforts have been so far made to manufacture crystalline cyanamide in consideration of above mentioned properties and many processes have been proposed, however, none of the manufacturing processes have been assured to be able to apply to industry with advantage.

Practicable processes of the prior art may be divided into the following two general groups. One group involves Werner's process (J. Chem. Soc. 109, 1325 (1916)) and the process of Sugino, Kanayama (J. Electrochem. Soc., Japan, T, 250 (1940)) as well as the process described in Organic Synthesis (34, 69 (1954)). The essential point of these processes consists of the fact that cyanamide is comparatively stable to acetic acid. In these processes, calcium cyanamide is neutralized by glacial acetic acid in the presence of a small amount of ice and cyanamide isolated is extracted by ether or mixed solvent of ether and acetone. Dehydration of the extract followed by removing the solvent by distillation affords crystalline cyanamide. A comparatively good yield was reported. However, the process is not adapted to mass production and is no more than an experimental process. Another group involves Baum's process (Biochem. Z., 26, 325) and process of Sugino, Aiya et al. (Japanese Patent No. 179,981), the process described in Inorganic Synthesis (3, 39 (1950)) and the process of Miller (J. Applied Chem. 6, 89 (1956)) etc. In Baum's process, water extract of calcium cyanamide is neutralized by carbon dioxide gas or sulfuric acid and calcium is removed as hardly soluble salt. Dilute aqueous solution of cyanamide thus obtained is concentrated below 40° C. under reduced pressure. Extraction of the residue with ether followed by removing the solvent affords crystalline cyanamide. In this case, however, it is very difficult to concentrate the cyanamide solution without any dimerisation. An improvement on this process was made by Sugino, Aiya et al. in which a dilute aqueous cyanamide solution, after adjusting the pH at about 7, is concentrated at low temperature (40° C.) up to a comparatively stable concentration, i.e. 40–50%. Extraction of the resulting solution with a large quantity of ether followed by dehydration with sodium acetate and removing the solvent affords crystalline cyanamide in a good yield. While, in the process of Miller, etc., cyanamide solution, which is adjusted at pH 6 by acetic acid, is concentrated at 40° C. under reduced pressure (10–20 mm. Hg), then it is once cooled to separate dicyanadiamide, filtered and the filtrate is further concentrated to 70–80% under the same conditions as described above. Crystalline cyanamide can be crystallized out by cooling the resulting solution. In these processes, there is nothing of difficulty in the manufacturing process of cyanamide solution. However, the processes of concentration, solvent extraction and crystallization are very troublesome for industrialization. The process of Inorganic Synthesis, in which sulfuric acid is used as neutralization agent, is technically disadvantageous owing to the reasons mentioned below.

As to the manufacturing process of aqueous cyanamide solution from calcium cyanamide, the most practical one is the carbon dioxide neutralization process. This has been widely used in an industrial scale for the manufacturing of dicyandiamide, and involves two processes, one of which is performed by suspending calcium cyanamide in water, into which carbon dioxide is directly introduced under atmospheric or elevated pressure followed by removal of the precipitated solid, while the other process is performed by extracting calcium cyanamide with water as calcium acid cyanamide solution and then by neutralizing it with carbon dioxide followed by filtration of precipitated calcium carbonate. (Hereinafter, the carbon dioxide neutralizing process in the text is referred to the above mentioned two processes.)

Sulfuric acid may be used as a neutralizing agent, however, it has such defects that its cost is high, neutralization can not be made so accurately, adsorption loss of cyanamide to gypsum is high and the refining of the product is difficult etc., therefore, it cannot be compared with the process using carbon dioxide in the viewpoint of commercial production. On this basis, the carbon dioxide neutralization process is adopted in the present invention. In case of manufacturing cyanamide, it is desirable to obtain the solution of as high concentration as possible by applying multistage extraction.

The essence of the present invention will be explained in details by describing the concentration process of dilute aqueous solution of cyanamide which is the most important factor of the process of the invention.

When a neutral cyanamide solution obtained by the carbon dioxide neutralization process is concentrated, it may be worked up comparatively safely as long as the concentration of cyanamide is low, however, the dimerisation and hydrolysis of cyanamide will be rapidly accelerated as its concentration becomes higher. It is observed by our experiments that in case 4% neutral solution of cyanamide is concentrated under reduced pressure without any pretreatment, when the concentration of cyanamide comes up to 60–70%, dimerisation takes place explosively and cyanamide will be dimerized mostly to dicyandiamide etc. The reason would be based on the fact that neutral cyanamide solution will easily become weak basic during the concentration. It is further observed that even when the cyanamide solution, being weak basic, is once neutralized by adding a small amount of acetic acid, it will become again weak basic after a while. This tendency will be continued throughout the concentration process. Therefore, it is necessary to pay continuous attention to pH of the solution and to keep it to a suitable range by adding acid timely. But such a process is considerably troublesome even in experimental works and difficult to be performed smoothly. Even if it is performed with much care, lowering of the yield and purity of cyanamide cannot be avoided, because a considerable degree of dimerisation and hydrolysis of cyanamide still occur due to the difficulty of maintaining neutral condition. In connection with this, it is indispensable to keep the temperature of the solution as low as 40° C., so that the concentration process of cyanamide solution becomes considerably inefficient.

As to the phenomenon of increasing the pH of cyanamide solution during concentration, the fundamental problem of this invention, it may be seen that any investigation has hitherto not been made and consequently the reason is not clear. Thereupon, the inventors have conducted investigations in details to clarify the reason and find an effective method to prevent it. As the result, it has been found that a very small amount of calcium salts contained in the neutral cyanamide solution, the calcium salts being contained mainly as carbonate, gradually react with cyanamide as the concentration becomes higher during the concentration process and produce alkaline substance which increases the pH of the solution and causes dimerisation.

The inventors have made further investigations based on this new knowledge and have achieved an improvement of manufacturing process of crystalline cyanamide and its concentrated aqueous solution by reducing the content of this calcium salt below a certain amount.

Calcium content in the neutral cyanamide solution obtained by carbon dioxide neutralization process is more or less varied according to its operating conditions. Usually, under atmopheric pressure, the calcium content in 5–8% neutral cyanamide solution will be about a degree of 20–30 mg./100 cc. and in about 20% neutral solution, it will be about 70–100 mg./100 cc. When the solutions are concentrated under reduced pressure without any pretreatment, dimerization will take place and crystalline cyanamide cannot be obtained. On the contrary, it is found that if the calcium contents of these solutions are reduced to some mg./100 cc. by a suitable means, the increase of pH during concentration will no more take place, and consequently the concentration process can be carried out safely even at temperatures as high as 70–90° C., and thus crystalline cyanamide or aqueous cyanamide solution of any concentration can be prepared in quantitative yield.

According to the research made by the inventors, allowable limit of calcium in the cyanamide solution is about 0.2% max. to the cyanamide in the solution, so that it is important to reduce the calcium content below this limit. If it is reduced below the degree of 0.1%, safe operations and quantitative yield can be assured.

Based on this new discovery, various investigations were made about the process of further reducing the very small amount of calcium content, and the inventors have reached a conclusion that it is the only effective industrial process to treat the neutral cyanamide solution with cation exchange resin.

The present invention is based on this original idea.

In the present invention, the cyanamide aqueous solution obtained by the carbon dioxide neutralization process is treated with cation exchange resin (for example, Amberlite IRC–50), reducing the calcium content below 0.2 by weight of the total cyanamide, and the resulting solution is concentrated. The concentration temperature is not necessary to be kept below 40° C. as in the prior art, but it can be made to a fairly high temperature (for example, 70–90° C.) without dimerisation and hydrolysis of cyanamide, so that the concentration process of cyanamide solution can be performed industrially simply and safely. It can be concentrated to any concentration without any attention. To manufacture crystalline cyanamide, the concentrated solution of cyanamide (70–90%) manufactured as described above is directly cooled to separate a part of cyanamide in crystalline state or the said solution is extremely concentrated under reduced pressure and by cooling the resulting liquid almost all cyanamide in it can be crystallized out. The product has a high purity of 90–98%, and the loss due to distillation is generally about 1%, so that the yields of crystalline cyanamide and of concentrated solution are almost quantitative. In the prior art, crude product contains some impurities (metallic salts and sulfide, etc.) and the refining of it is considerably difficult, while in the present process any of these impurities will be removed.

As the one in which the cyanamide solution is treated with cation exchange resin, any process can be adopted. In industrial practice, however, continuous process by tower system will be most rational. In this case, there is evolved carbon dioxide gas, so that the up-flow system will be convenient. And, as the cation exchange resin, that of carboxylic acid type is suitable, which has such advantages as having no adsorption of cyanamide, regeneration being easy, and absorption capacity of calcium being high. The adsorption amount of calcium is varied according to the kinds of resins, for example, in Amberlite IRC–50, it is about 0.15 g./dried resin 1 g. (in dilute aqueous cyanamide solution). Since the calcium content of aqueous cyanamide solution is very small, the consumption of resin is also very small and it is easily worked industrially. There is an effective process, in which cation exchange resin is coexisted in the neutral cyanamide solution and the concentration is performed along with the adsorption of calcium. However, this process is not so advantageous to manufacture crystalline cyanamide or its solution of high concentration.

As mentioned above, in the present invention, troublesome operations and expensive extraction with organic solvent etc. are entirely unnecessary, and a process is assured in which cyanamide crystals of high purity and concentrated solution thereof are manufactured with quantitative yield by the simplest operation, enabling very economical and industrial mass production.

Some examples according to the present invention will be given as follows.

*Example 1*

Calcium cyanamide suspended in five times amount of water, is neutralized by carbon dioxide gas perfectly and the resulting slurry is filtered. The filtrate is used to the second extraction of new calcium cyanamide in the same manner. By repeating these procedures several times, a cyanamide solution of moderate concentration (cyanamide content 22.0 g./100 cc., calcium content 75.2 mg./100 cc.) is obtained. This is passed, with up-flow system, through resin layer of Amberlite IRC–50 (200 cc.) of wet resin is filled from lower part of a tower, in which the Amberlite is filled up, and the solution is flowed out from side pipe at the upper part of the tower. The rate of flow is adjusted to 500–1000 cc./hour. A small amount of carbon dioxide gas evolved in the tower is discharged from the opening at the top of the tower. The effluent, in which almost no calcium exists, contains 21.5 g. cyanamide in 100 cc. From the cyanamide solution thus obtained, crystalline cyanamide is manufactured by the following two processes.

(A) 1.5 l. of the cyanamide solution is concentrated under reduced pressure at 70–90° C., till the concentration of cyanamide reaches about 90%, then cooled to ordinary temperature and cyanamide crystallized is separated by filtration. The crystal is dried in vacuum. 246.0 g. crystalline cyanamide, having 96% purity and 75 cc. filtrate (cyanamide concentration 68%) are obtained. The yield of cyanamide reached more than 99% including the amount of cyanamide (84.5 g.) in the filtrate. The loss during the concentration is less than 1%.

(B) 1.5 l. of the cyanamide solution is concentrated to almost dryness under reduced pressure at 70–90° C. Almost all cyanamide can be crystallized by cooling the resulting liquor, which is dried in vacuum. Yield 339 g. (purity 92%), 97%. If necessary, it is recrystallized from ether and benzene. Thus pure products of more than 98% purity may be obtained in a quantitative yield.

*Example 2*

The suspension of calcium cyanamide in a suitable amount of water is neutralized by carbon dioxide gas and the slurry is filtered. The filtrate contains 7.96 g./100 cc. cyanamide and 28.8 mg. Ca/100 cc. 4.2 l. of the solution obtained is passed, in up-flow system, through a tower filled with Amberlite IRC-50 (100 cc. of wet resin is filled). The rate of flow is 1000 cc./hour, and the resin layer is washed with water (about two times of the amount of resin), and the wash is combined with the effluent. The calcium content of the effluent is 1 mg./100 cc. This solution is concentrated to an extremely concentrated state as above mentioned. This gives crystalline cyanamide by cooling which is dried in vacuum. Yield; 343 g. (purity 95%), 98%.

*Example 3*

Carbon dioxide gas is introduced into aqueous acidic calcium cyanamide solution which is prepared by extraction of calcium cyanamide with water. By filtration of precipitated calcium carbonate, an aqueous cyanamide solution (cyanamide concentration 5.44 g./100 cc., calcium content 32 mg./100 cc.) is obtained. 5 l. of the solution is passed, in up-flow system, through a tower filled with Amberlite IRC-50 (160 cc. of resin is filled) and the effluent containing almost no calcium is combined with tower wash. This is worked up as described in Example 1-A. 203 g. cyanamide having 96% purity is obtained. The filtrate is 70 cc. solution containing 69 g. of cyanamide. The total yield, 97%, includes the amount of cyanamide in the filtrate.

Having thus described the invention, what is claimed as new and desired to be secured by Letters Patent is:

1. In a process for the production of crystalline cyanamide the step wherein a dilute cyanamide aqueous solution which is obtained by carbon dioxide gas neutralizing process from calcium cyanamide, is treated with carboxylic type cation exchange resin until the calcium content is reduced to less than about 0.2% by weight based on the total cyanamide.

2. A process of producing crystalline cyanamide from calcium cyanamide, which comprises treating a dilute cyanamide aqueous solution, obtained by carbon dioxide gas neutralizing process from calcium cyanamide, with carboxylic type cation exchange resin until the calcium content of said solution is reduced to less than about 0.2% by weight based on the total cyanamide, and then concentrating the thus treated solution.

3. A process as claimed in claim 2, wherein the concentration of the carboxylic type cation exchange resin-treated cyanamide solution containing calcium less than about 0.2% by weight based on the total cyanamide is carried out at a temperature of 70° to 90° C. under reduced pressure.

4. A process of producing crystalline cyanamide, which comprises suspending calcium cyanamide in water, neutralizing the resulting suspension with carbon dioxide gas whereby water-insoluble calcium salt is precipitated and thereafter removed by filtration, treating the dilute cyanamide aqueous solution thus obtained with carboxylic type cation exchange resin until the calcium content of said solution is reduced to less than about 0.2% by weight based on the total cyanamide, and then concentrating the treated solution, at 70° to 90° C. under reduced pressure.

5. A process of producing crystalline cyanamide, which comprises extracting calcium cyanamide with water, neutralizing the water extract with carbon dioxide gas whereby water-insoluble calcium salt is precipitated and thereafter removed by filtration, treating the dilute cyanamide aqueous solution thus obtained with carboxylic acid type cation exchange resin until the calcium content of said solution is reduced to less than about 0.2% by weight based on the total cyanamide, and then concentrating the treated solution at 70° to 90° C. under reduced pressure.

References Cited in the file of this patent

UNITED STATES PATENTS

| | | |
|---|---|---|
| 1,380,223 | Lidholm | May 31, 1921 |
| 1,673,820 | Hetherington et al. | June 19, 1928 |
| 2,230,641 | Findlay | Feb. 4, 1941 |